Figure 7:
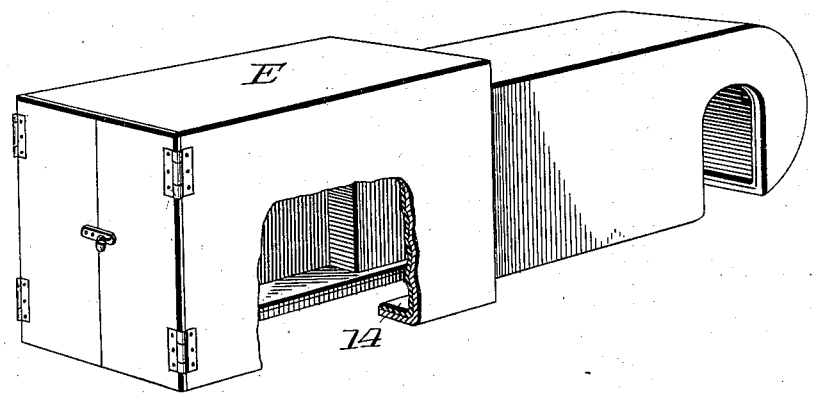

No. 650,253. Patented May 22, 1900.
H. KELLER.
THRESHER.
(Application filed Nov. 23, 1899.)
(No Model.) 6 Sheets—Sheet 1.
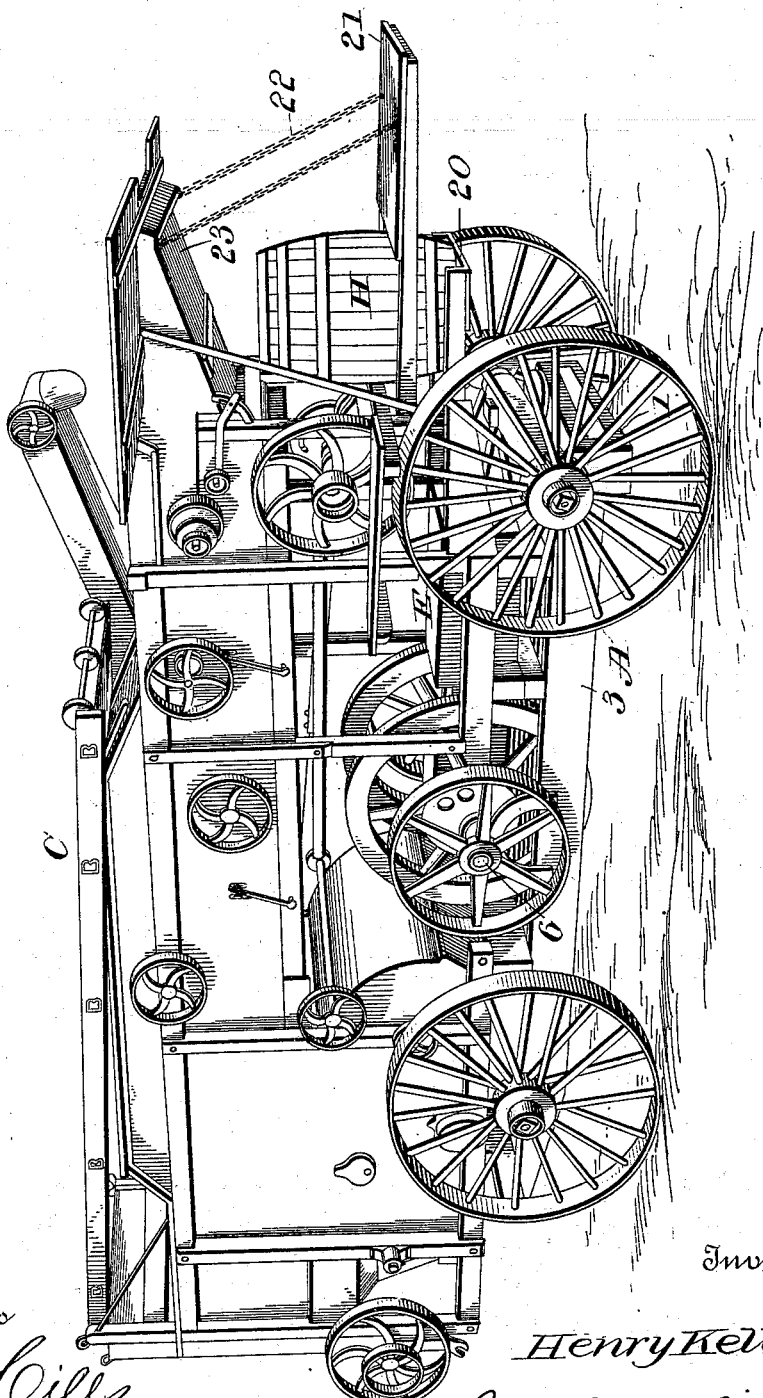
Witnesses
L. C. Hills.
Wm F. Doyle.
Inventor
Henry Keller
By Van Buren Hillyard.
Attorney.

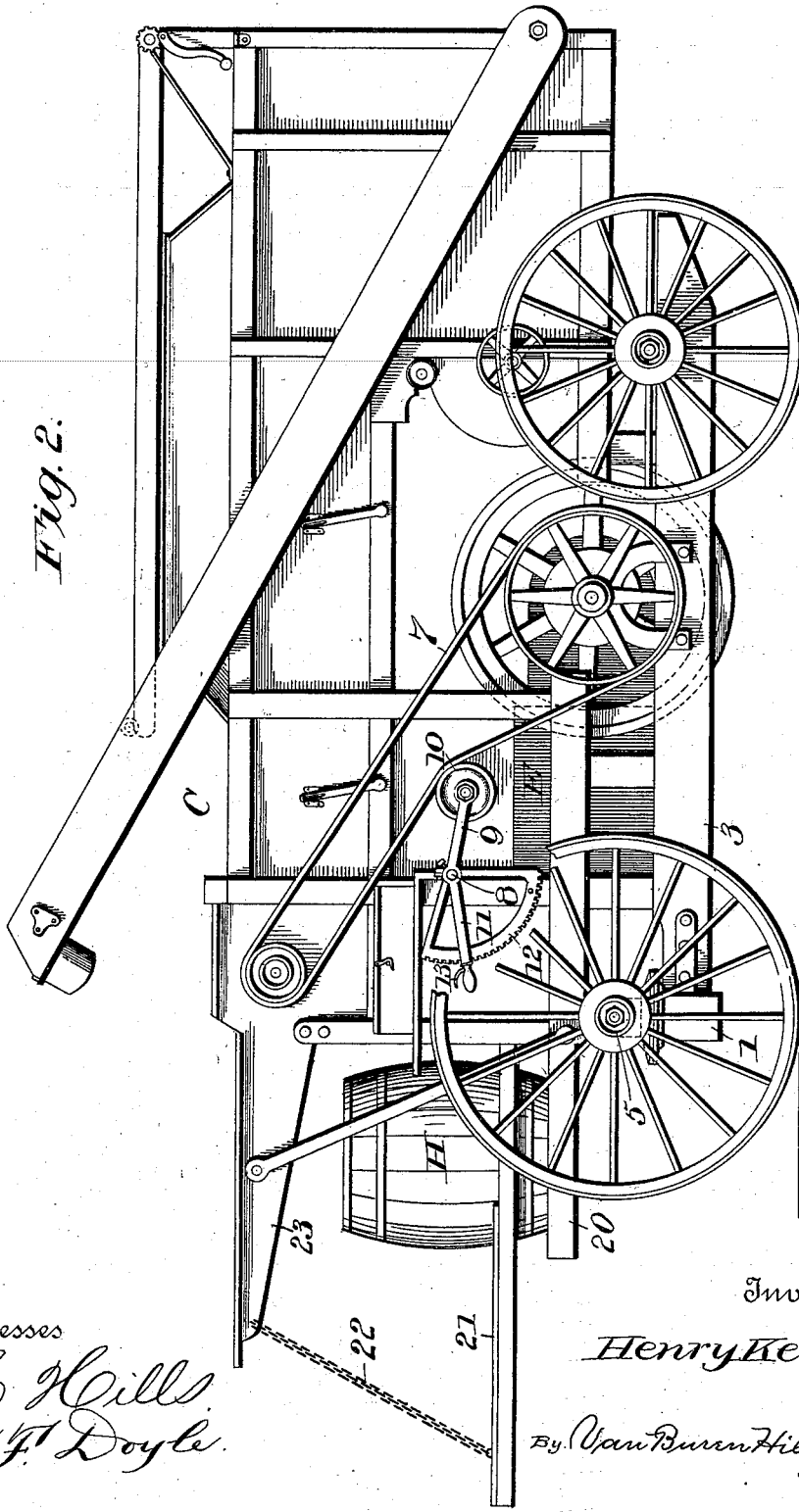

No. 650,253. Patented May 22, 1900.
H. KELLER.
THRESHER.
(Application filed Nov. 23, 1899.)
(No Model.) 6 Sheets—Sheet 3.
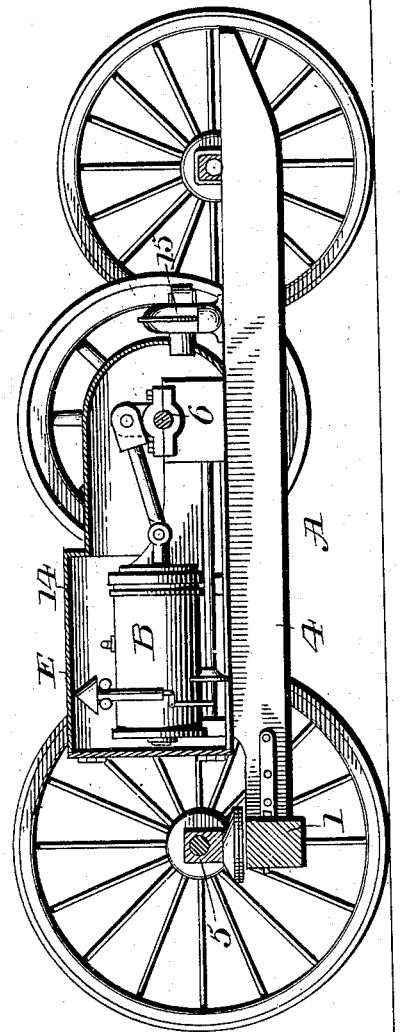
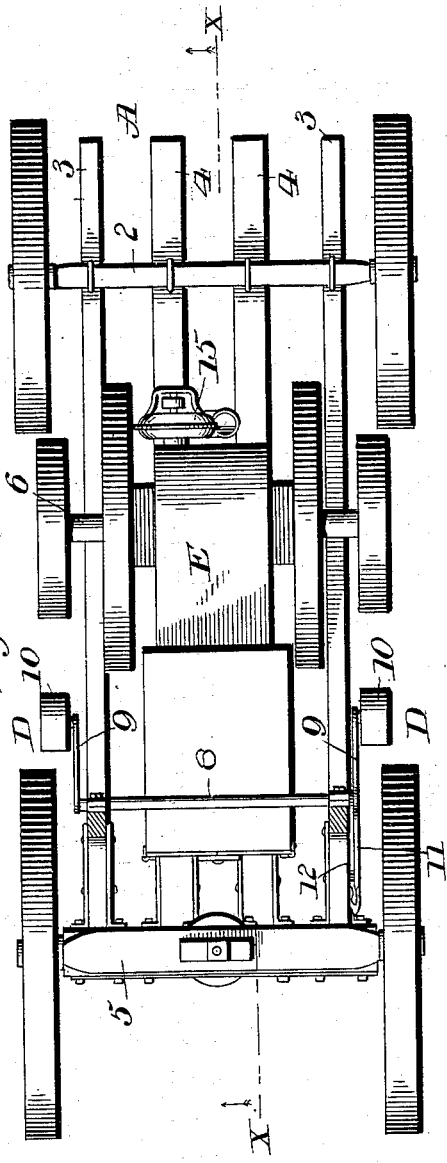
Witnesses
L. C. Hills.
Wm. F. Doyle.
Inventor
Henry Keller
By Van Buren Hillyard.
Attorney.
THE NORRIS PETERS CO., PHOTO-LITHO., WASHINGTON, D. C.

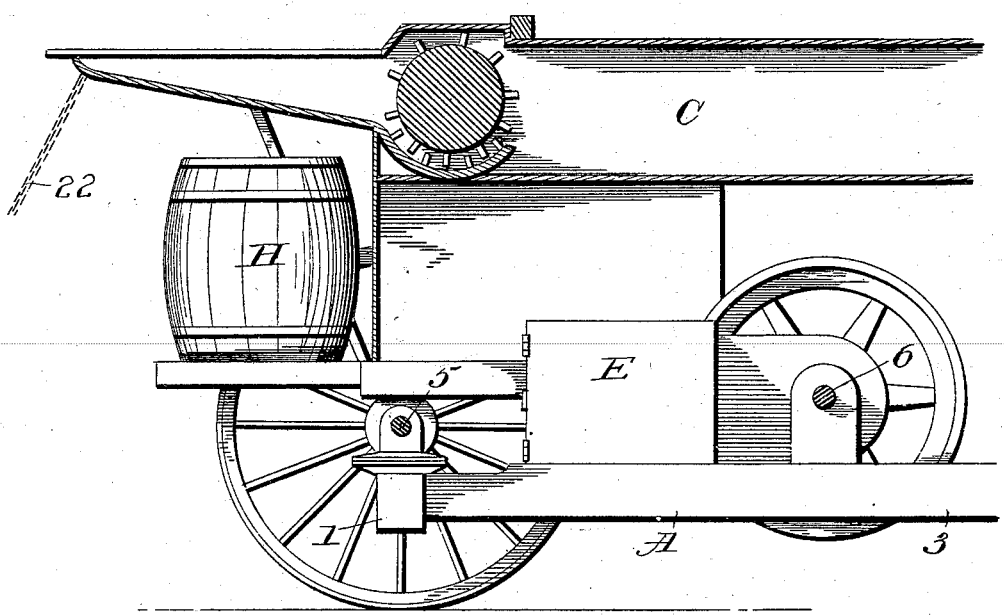
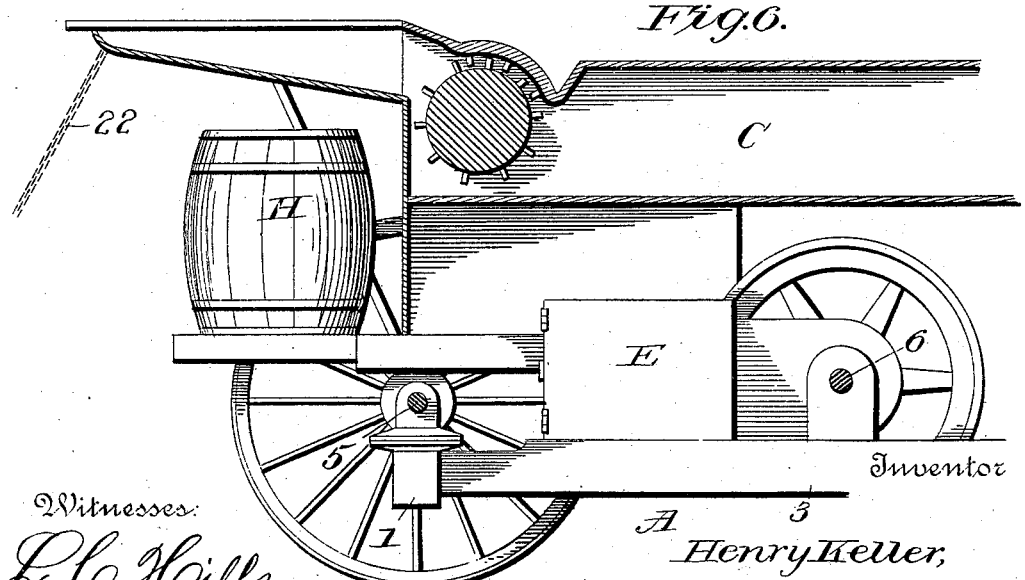

No. 650,253. Patented May 22, 1900.
H. KELLER.
THRESHER.
(Application filed Nov. 23, 1899.)
(No Model.) 6 Sheets—Sheet 5.

Witnesses
L. C. Hills
Wm. F. Doyle

Inventor
Henry Keller

By Van Buren Hillyard,
Attorney

THE NORRIS PETERS CO., PHOTO-LITHO., WASHINGTON, D. C.

No. 650,253. Patented May 22, 1900.
H. KELLER.
THRESHER.
(Application filed Nov. 23, 1899.)
(No Model.) 6 Sheets—Sheet 6.
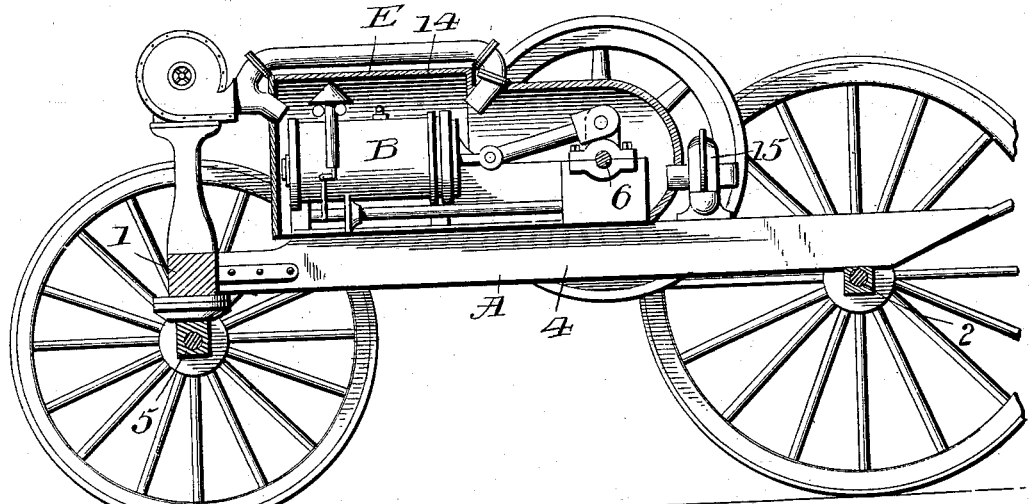
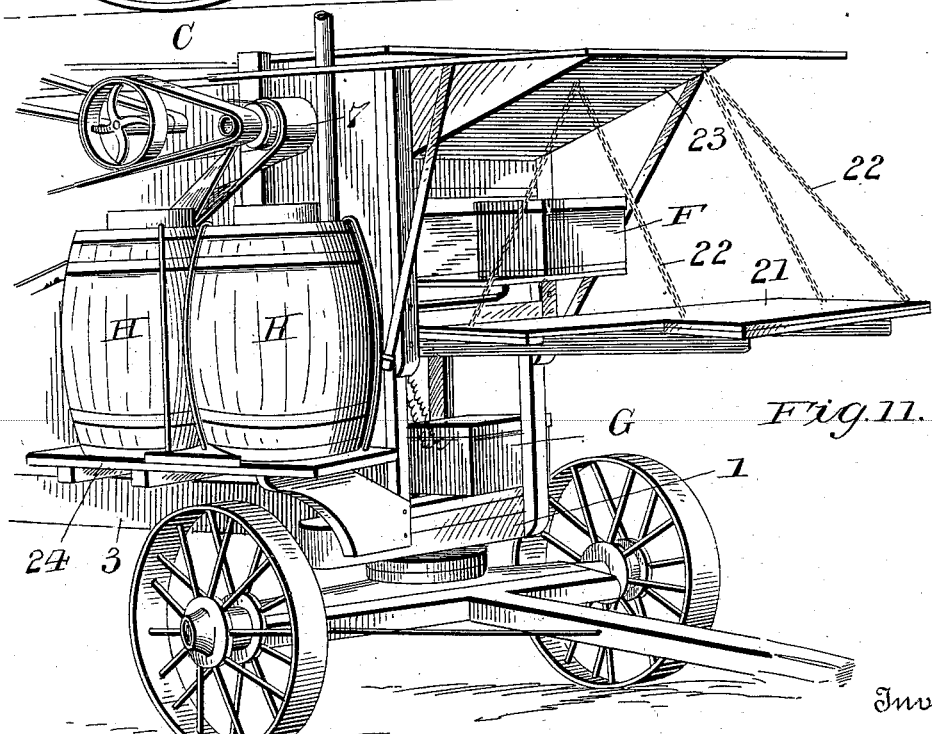
Witnesses
L. C. Hills.
W. F. Doyle
Inventor
Henry Keller,
By Van Buren Hillyard,
Attorney

UNITED STATES PATENT OFFICE.

HENRY KELLER, OF SAUK CENTRE, MINNESOTA.

THRESHER.

SPECIFICATION forming part of Letters Patent No. 650,253, dated May 22, 1900.

Application filed November 23, 1899. Serial No. 738,036. (No model.)

*To all whom it may concern:*

Be it known that I, HENRY KELLER, a citizen of the United States, residing at Sauk Centre, in the county of Stearns and State of Minnesota, have invented certain new and useful Improvements in Threshers; and I do hereby declare the following to be a full, clear, and exact description of the invention, such as will enable others skilled in the art to which it appertains to make and use the same.

This invention relates to threshing machinery, and most especially to threshers, the objects being to improve the general construction of either the overshot or the undershot type; to provide in a single organized structure and mounted upon one truck a motor and threshing mechanism; to dispose the threshing and motor mechanisms upon the truck in such a manner as to avoid interference and admit of any desired machinery replacing the threshing mechanism, whereby the truck and engine can be used for a variety of purposes; to equalize the strain upon both sides of the machine as nearly as practicable by providing two drive-belts; to obtain a maximum amount of belt-surface, which is of material advantage, without necessitating the provision of an extra-heavy wide belt; to obviate the use of the ordinary steam-engine and the dangers and risks incurred by its use; to dispose the parts compactly and facilitate the performance of the work in a rapid and effective manner, and to devise a machine which will run smoothly and accomplish the required work in a thorough and effective manner.

To those skilled in the art many advantages other than those enumerated will readily suggest themselves, and to this end and to a full disclosure of the invention reference is to be had to the following description and the accompanying drawings, in which—

Figure 8:
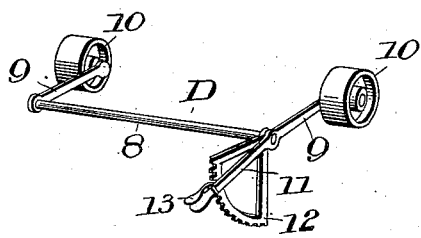
Figure 9:
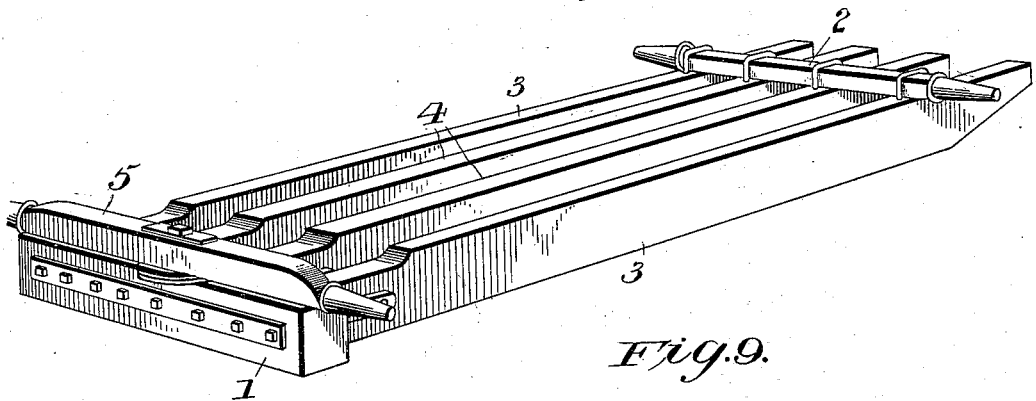

Figure 1 is a perspective view of a machine constructed in accordance with and embodying the essence of the invention. Fig. 2 is a side elevation. Fig. 3 is a longitudinal section on the line X X of Fig. 4 looking in the direction of the arrows. Fig. 4 is a top plan view of the truck, showing the engine and belt-tightener in position. Fig. 5 is a detail longitudinal section of the front portion of a thresher of the undershot type, showing the application of the invention. Fig. 6 is a view similar to Fig. 5, showing the invention applied to a thresher of the overshot class. Fig. 7 is a detail view of the engine-housing. Fig. 8 is a detail view of the belt-tightener. Fig. 9 is a detail view of the truck. Fig. 10 is a longitudinal section showing the body of the truck mounted upon the axles and a fan-blower arranged to deliver a blast of air upon opposite ends of the cylinder. Fig. 11 is a detail perspective view of the front portion of a thresher, showing a different arrangement of the parts.

Corresponding and like parts are referred to in the following description and indicated in all the views of the drawings by the same reference characters.

It is contemplated to apply the invention to any style, make, or design of thresher or separator, whether of the overshot or the undershot type and whether the body of the truck is suspended from or mounted upon the axles, and the engine may be of any style not requiring a fire or boiler, preferably a gasolene or like explosive variety of engine, whereby casualties from fire are reduced to a minimum. It is therefore to be understood that in adapting the invention to meet the many conditions various changes in the form, proportion, and minor details of construction may be resorted to without departing from or sacrificing any of the advantages of the invention.

The truck A may be high or low, according to the style of machine—*i. e.*, its body may be suspended from the axles or mounted thereon. The low truck can pass over smooth roads, enables the use of front wheels of large diameter, and avoids a high lift of the bundles when feeding them to the thresher. If the fly-wheels of the engine are of large diameter or the machine is required to be drawn over rough roads and swampy lands, it is essential that the truck be high—*i. e.*, that the body be mounted upon the axles, so as to provide ample room below the axles and truck-body for the clearance of projecting parts in the path of the machine. The body of the truck is composed of a cross-bar 1, rear axle 2, and a series of longitudinal timbers secured to the bar 1 and axle 2 and designated as "side sills" 3 and "intermediate sills" 4 4.

The front axle 5 has the ordinary king-bolt and fifth-wheel connection with the cross-bar 1 either above or below, according to the relative position of the truck-body.

The engine B is mounted on the intermediate sills 4 and the thresher and separator C on the side sills 3. It will thus be seen that the parts are independently mounted and that the thresher can be removed from the truck and readily substituted by other machinery to be driven by the engine.

The thresher and separator, either of the overshot or the undershot type, is mounted upon the side sills 3 in any manner so as to be removed, as shown in Figs. 3 and 4, when it is required to press the engine into service for driving other machinery.

The engine B is of the type operated by gasolene, which is vaporized and mixed with air and exploded, and is located at the front end of the machine, below the threshing-cylinder, and will be of any power, according to the size and capacity of the machine. The crankshaft 6, operated from the engine, is belted to the thresher, two belts 7 being employed, as thereby a great amount of belt-surface can be obtained to secure a positive transmission of power. These drive-belts 7 are disposed upon opposite sides of the machine, with a belt-tightener D, intermediate of the engine and threshing mechanism, tightening the two belts from one side of the machine at the same time. This belt-tightener consists of a shaft 8, crank-arms 9 at the ends of the shaft 8, and pulleys 10, mounted upon the crank-arms and adapted to bear against parts of the belts. A lever 11 is formed with or applied to one of the crank-arms and is provided with the usual hand-latch 13 to coöperate with the teeth of the segment 12 and hold the tightener in an adjusted position.

The engine is housed, the housing E being lined with rubber or fine cloth 14 or other suitable material to make a tight closure. Access is had to the interior of this housing by means of doors, which are locked to prevent tampering with the engine when left unattended or when it is required to keep unauthorized parties from fingering the inclosed parts. Combined with the housing E is a suction-fan 15, attached to the rear end, which will continuously suck the dust, straw, and all dirt away from the engine and blow it to one side of the machine or into the fanning-mill of the separator to supplement the action of its fan. The housing E may be any neat cabinet-work and of a size and shape to inclose the engine without lost space.

The engine being of the explosive type its cylinder is heated when the engine is running, the overheating being prevented in the usual manner by circulating water through the jacket fitted to the cylinder. The cooling is also effected by means of a fan-blower 16, mounted upon a convenient portion of the machine-frame and having branch pipes 17 and 18 extending therefrom and running to opposite ends of the engine-cylinder, so as to deliver a blast of air thereon and keep it cool. These air-blasts also serve to keep the interior of the housing E free from all dust and foreign matter.

The reservoir F for the gasolene or other volatile hydrocarbon may be located at the most convenient point, so as to be out of the way and occupy the most advantageous position. The same is true of the barrel or tank H for the water and the box G, containing the battery for starting the engine—i. e., exploding the preliminary charges. As shown, the barrel or tank H is placed either upon a platform 20 at the front end of the machine or upon a shelf 24 at one side of the thresher.

The feeder's platform 21 is located in front of the platform 20 and is braced at its outer end by means of chains 22, extending to the outer end of the feed-table 23.

From the forgoing it will be readily understood that the machine when completed is compact in every part, is portable, and does not require the employment of a steam-engine for running the operating parts of the thresher and separating machinery.

Having thus described the invention, what is claimed as new, and desired to be secured by Letters Patent, is—

1. In threshing machinery, a truck comprising independent outer and intermediate longitudinal timbers, a separator mounted upon the outer timbers, and an engine of the gasolene type placed upon the intermediate timbers and disconnected from the other timbers and the separator, substantially as and for the purpose described.

2. In threshing machinery, a truck, a separator and a gas-engine supported thereon independently of each other upon independent timbers of the truck, with the engine beneath the threshing mechanism, and a lined housing for said engine supported on the same truck-timbers, as set forth.

3. In threshing machinery, a truck, a separator and a gas-engine supported thereon on independent timbers and independent of each other, with the engine beneath the threshing mechanism, a lined housing for said engine supported upon the same timbers therewith, and means for keeping said housing free from dust, substantially as specified.

In testimony whereof I affix my signature in presence of two witnesses.

HENRY KELLER.

Witnesses:
C. M. SPRAGUE,
F. W. SPRAGUE.